(No Model.)
W. W. GRISCOM.
DISTRIBUTION OF ELECTRICITY BY SECONDARY BATTERIES.
No. 400,843. Patented Apr. 2, 1889.
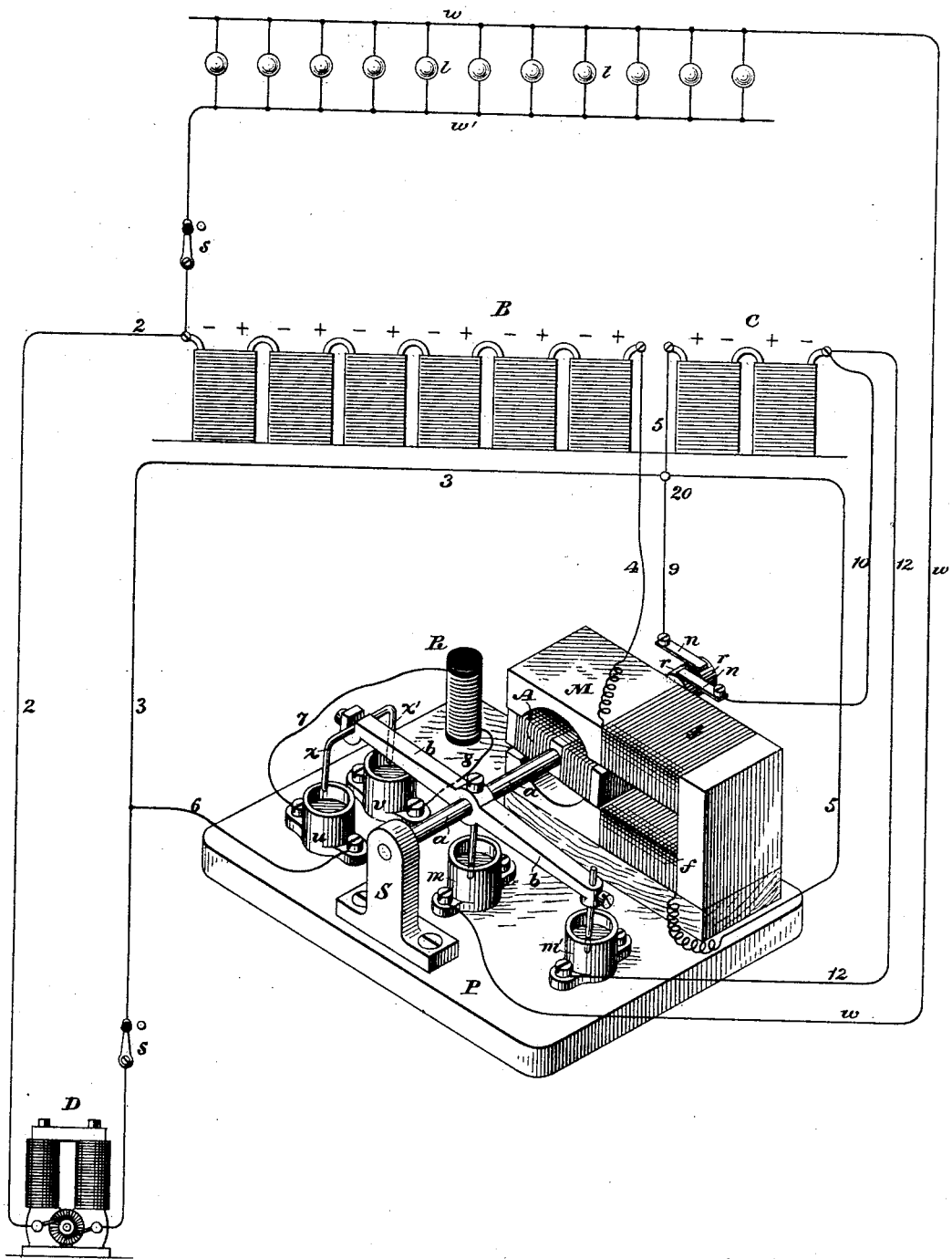

United States Patent Office.

WILLIAM W. GRISCOM, OF HAVERFORD COLLEGE, ASSIGNOR TO THE ELECTRO DYNAMIC COMPANY, OF PHILADELPHIA, PENNSYLVANIA.

DISTRIBUTION OF ELECTRICITY BY SECONDARY BATTERIES.

SPECIFICATION forming part of Letters Patent No. 400,843, dated April 2, 1889.

Application filed January 12, 1889. Serial No. 296,168. (No model.)

*To all whom it may concern:*

Be it known that I, WILLIAM W. GRISCOM, a citizen of the United States, and a resident of Haverford College, in the county of Montgomery and State of Pennsylvania, have invented certain new and useful Improvements in the Distribution of Electricity by Secondary Batteries, of which the following is a specification.

My invention is an improvement in the distribution of electricity by secondary batteries.

I employ a secondary battery to supply electricity to the translating devices—such as lamps—and a primary generator of electricity—such as a dynamo-electric machine—to supply electricity to the battery. The number of cells of battery employed must be sufficient to properly supply the lamps, and it occasionally happens that when the lamps are being supplied by the battery the dynamo is operating to charge the battery. To do this, its electro-motive force is raised above the electro-motive force of the battery. This excess in electro-motive force is noticeable in its effects at the lamps, and is somewhat injurious. Especially is this true as the battery nears full charge.

My improvements are directed to obviating this difficulty; and they consist in means for automatically inserting and withdrawing a compensating resistance—that is, a resistance capable of compensating for the excess of electro-motive force. This compensating resistance is an artificial resistance, either wholly or in part. If in part, it is accompanied by a source of counter electro-motive force equal in value to the additional artificial resistance required to produce the desired result. I insert this compensating resistance in the working-circuit between the battery and translating devices during the process of charging the battery and withdraw it as soon as the process of discharge is established. Thus the electro-motive force at the lamp-terminals is maintained constant or normal. For the compensating resistance I prefer to use electrolytic cells—such as cells of secondary battery—connected into circuit in reverse, or so as to oppose their electro-motive force to that of the current from the dynamo, and at the same time receive a current of charge which maintains them in an active condition.

The automatic apparatus for introducing and withdrawing the compensating resistance, as described, consists of a polarized electro-magnet located in a branch circuit between the dynamo and battery and between the battery and lamps, so that it is operated in one sense or direction by current flowing into the battery and in the opposite direction by current flowing out of the battery.

The accompanying drawing illustrates my invention.

D is a dynamo-electric machine.

B is a secondary battery consisting of a series of cells connected to the dynamo by conductors 2 and 3.

$w\ w'$ is a working-circuit containing lamps 1 in multiple arc.

Switches $s\ s$ are provided to divide the conductors 3 and $w'$ when desired.

At C there is one or more electrolytic cells. These are preferably cells of secondary battery, like those composing the series B. When these cells are in circuit between the battery and lamps, they present an artificial resistance to the flow or passage of current, which is in part due to their internal resistance and in part to their counter electro-motive force, either or both effective as a compensating resistance.

M is a polarized electro-magnetic device located upon a base-board, P. It consists of iron cores having coils of wire $f$, like the field-magnets of a dynamo. The coil $f$ has one terminal connected by wire 4 to a terminal of battery B, and a similar terminal of the electrolytic cells C is connected by wire 5 to the opposite terminal of coil $f$. An electro-magnet, A, is placed between the poles of magnet M, free to oscillate. Its single coil of wire is connected to insulated rings on the arbor $a$, upon which rest brushes $n\ n$, which are respectively connected by wires 9 and 10 to opposite terminals of the cells C, by which means the magnet A is permanently polarized. Upon the board P are standards S, forming bearings for the arbor $a$. Magnet A is fixed to one end of arbor $a$, and arm $b$ is fixed to arbor $a$ near its opposite end. Near the center of bar $b$ a conducting-contact dips into mercury-cup $m$, which is the terminal of the working-circuit $w$. Mercury-cup $m'$ is electrically connected by wire 12 to the terminal of the electrolytic cells C. Upon one end of bar $b$ there is a double contact, $x\ x'$, the contact $x'$ being longer than $x$. Both dip into mercury-cups $u\ v$. These mercury-cups are connected through an artificial resistance, R, by conductors 7 and 8. Mercury-cup $u$ is connected to conductor 3 by wire 6 at a point between the dynamo and battery.

The apparatus is capable of assuming two positions: first, when current is flowing from the dynamo into the battery, and, second, when current is flowing from the battery to supply the lamps.

The apparatus is shown in the first position. The compensating resistance, consisting of two cells of secondary battery, is connected in circuit between the battery and lamps. The circuit may be traced from the dynamo via conductor 2 to the negative pole of the battery, and from the opposite terminal of the dynamo via conductor 3 to point 20, thence via conductor 5, through coil $f$, and conductor 4 to the positive pole of the battery. The battery is in process of receiving its charge. We will assume that some lamps are in use—conductor $w'$ of the working-circuit is connected directly to the negative pole of the battery and conductor 2; conductor $w$ is connected to mercury-cup $m$; circuit passes thence via bar $b$, cup $m'$, conductor 12 to cells C, to conductor 5, to point 20, and conductor 3. Current from the dynamo may therefore charge the battery B and a portion pass on to energize the lamps. The portion of current from the dynamo which passes the terminal 20 of battery B passes through the compensating resistance C, which reduces the electro-motive force by an amount equal to the amount by which the electro-motive force of the dynamo exceeds that of the battery.

In the second condition we will assume that the dynamo has stopped producing a current of charge, and that the lamps are being supplied by the battery. No current flows in conductors 2 and 3. Conductor $w'$ of the working-circuit is connected to the negative pole of battery B. From the opposite terminal of battery B current flows via 4, $f$, 5, C, 12, $m'$, $b$, $m$, to $w$; but as the direction of current through coil $f$ is reversed the position of magnet A is reversed and bar $b$ is tilted, breaking circuit at $m'$ and closing circuit at $u\ v$. Arm $x'$ first enters cup $v$; circuit passing via 4, 5, 20, 3, 6, 7, R, 8, $v$, $x'$, $b$, $m$, to $w$. Contact $x$ almost immediately enters cup $u$. Circuit then passing via 6, $u$, $x$, to $b$, and cutting out resistance R, which is a so-called "spark-coil," and is used on the return-movement of bar $b$ to prevent sparking at the break-points $u$ and $v$. It will thus be seen that when the dynamo is operating to charge the battery the compensating resistance is in circuit between the battery and lamps; and when the dynamo is idle and the battery is supplying current to the lamps the resistance is out of circuit.

What I claim, and desire to secure by Letters Patent, is—

1. The combination of a primary generator of electricity, a charging-circuit, a secondary battery, a working-circuit containing a series of translating devices, a compensating resistance to be inserted and withdrawn with respect to the working-circuit between the battery and translating devices, a switch or circuit changer for inserting and withdrawing said resistance, and an electro-magnet located in a branch circuit between the dynamo and battery and between the battery and translating devices to control said switch.

2. The combination of a dynamo-electric machine, a charging-circuit, a secondary battery, a working-circuit containing a series of translating devices, a compensating resistance consisting of one or more electrolytic cells to be inserted and withdrawn with respect to the working-circuit between the battery and translating devices, a switch or circuit-changer for inserting and withdrawing said resistance, and an electro-magnet located in a branch circuit between the dynamo and battery and between the battery and translating devices operating to control said switch, substantially as described.

3. The combination of a dynamo-electric machine, a charging-circuit, a secondary battery, a working-circuit containing lamps in parallel circuit, a compensating resistance consisting of one or more electrolytic cells yielding a counter electro-motive force with respect to the battery, a switch or circuit-changer for inserting and withdrawing said resistance, and an electro-magnet located in a branch circuit between the dynamo and battery and between the battery and lamps operating to control said switch, substantially as described.

4. The combination of a primary generator of electricity, a charging-circuit, a secondary battery, a working-circuit containing a series of lamps in multiple arc with the battery, a compensating resistance, a switch or circuit-changer for inserting and withdrawing said resistance with respect to the working-circuit, and a polarized electro-magnet located in a branch circuit between the dynamo and battery and between the battery and lamps operating to control said switch or circuit-changer, substantially as described.

5. The combination of a primary generator of electricity, a secondary battery connected therewith, a working-circuit connected with the secondary battery and containing translating devices, one or more electrolytic cells located between the battery and translating devices, and a switch for varying the position of such cells with respect to the working-circuit, substantially as described.

6. The combination of a primary generator of electricity, a secondary battery connected therewith, a working-circuit connected with the secondary battery and containing translating devices—such as lamps—and one or more cells of secondary battery located in circuit between the battery and translating devices yielding a counter electro-motive force with respect to said battery, substantially as described.

7. The combination of a primary generator of electricity, a secondary battery connected therewith, a working-circuit connected with the secondary battery containing translating devices, a suitable device yielding a counter electro-motive force to be inserted and withdrawn with respect to the working-circuit at a point between said battery and translating devices, and a switch for varying the position of such counter electro-motive force device with respect to the working circuit, substantially as described.

WILLIAM W. GRISCOM.

Witnesses:
   D. H. BATES,
   HUGH R. PARRISH.